(12) United States Patent
Lee et al.

(10) Patent No.: US 12,437,705 B2
(45) Date of Patent: Oct. 7, 2025

(54) PIXEL AND DISPLAY DEVICE INCLUDING THE SAME

(71) Applicant: Samsung Display Co., Ltd., Yongin-Si (KR)

(72) Inventors: Se Hyun Lee, Yongin-si (KR); Jin Joo Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/422,008

(22) Filed: Jan. 25, 2024

(65) Prior Publication Data

US 2025/0006105 A1 Jan. 2, 2025

(30) Foreign Application Priority Data

Jun. 29, 2023 (KR) .................. 10-2023-0084442

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/08* (2013.01); *G09G 2320/045* (2013.01)

(58) Field of Classification Search
CPC ....................................................... G09G 3/32
See application file for complete search history.

(56) References Cited

U.S. PATENT DOCUMENTS

| | | | |
|---|---|---|---|
| 9,626,904 B2 | 4/2017 | Kimura et al. | |
| 11,387,304 B2 | 7/2022 | Sato | |
| 11,430,390 B2 | 8/2022 | Jeong et al. | |
| 2011/0199357 A1 | 8/2011 | Chung et al. | |
| 2012/0038605 A1 | 2/2012 | Han | |
| 2018/0197462 A1* | 7/2018 | Nagayama | G09G 3/325 |
| 2020/0320930 A1* | 10/2020 | Toyotaka | G09G 3/3233 |
| 2022/0366849 A1* | 11/2022 | Lee | H10K 59/124 |
| 2023/0018546 A1 | 1/2023 | Kim et al. | |
| 2024/0355279 A1* | 10/2024 | Lee | G09G 3/3233 |

FOREIGN PATENT DOCUMENTS

| | | |
|---|---|---|
| KR | 10-2297000 B1 | 9/2021 |
| KR | 10-2022-0020473 A | 2/2022 |
| KR | 10-2022-0155541 A | 11/2022 |

* cited by examiner

*Primary Examiner* — Joseph R Haley
(74) *Attorney, Agent, or Firm* — Innovation Counsel LLP

(57) ABSTRACT

A pixel includes: a first transistor including first, second, and gate electrodes, which are respectively connected to first, second, and third nodes; a second transistor connected between a data line and the third node, the second transistor including a gate electrode electrically connected to a first scan line; a third transistor connected between a first power line to which a voltage of a first driving power source is supplied and the first node, the third transistor including a gate electrode electrically connected to an emission control line; a first capacitor connected between the first and third nodes; a second capacitor connected between the second and third nodes; a third capacitor connected between the third node and a second power line to which a voltage of a second driving power source is supplied; and a light emitting element connected between the second node and the second power line.

18 Claims, 10 Drawing Sheets

PIXEL AND DISPLAY DEVICE INCLUDING THE SAME

CROSS-REFERENCE TO RELATED APPLICATION

The present application claims priority under 35 U.S.C. § 119 (a) to Korean patent application No. 10-2023-0084442 filed on Jun. 29, 2023 in the Korean Intellectual Property Office, the entire disclosure of which is incorporated herein by reference.

BACKGROUND

1. Technical Field

The present disclosure generally relates to a pixel and a display device including the same.

2. Related Art

With the development of information technologies, the importance of a display device which is a connection medium between a user and information increases. Accordingly, display devices such as a liquid crystal display device and an organic light emitting display device are increasingly used.

Recently, a Head Mounted Display Device (HMD) has been developed. The HMD is a display device which a user wears in the form of glasses or a helmet, thereby implementing Virtual Reality (VR) or Augmented Reality (AR), in which a focus is formed at a distance close to the eyes. A high-resolution panel is applied to the HMD, and accordingly, a pixel is required, which can be applied to the high-resolution panel.

The above information disclosed in this Related Art section is only for enhancement of understanding of the background of the disclosure and therefore it may contain information that does not form the prior art that is already known in this country to a person of ordinary skill in the art.

SUMMARY

Embodiments provide a pixel which can be applied to a high-resolution panel, and a display device including the pixel.

In accordance with an aspect of the present disclosure, there is provided a pixel including a first transistor, a second transistor, a third transistor, a first capacitor, a second capacitor, a third capacitor, and a light emitting element. The first transistor includes a first electrode connected to a first node, a second electrode connected to a second node, and a gate electrode connected to a third node. The second transistor is connected between a data line and the third node, the second transistor including a gate electrode electrically connected to a first scan line. The third transistor is connected between a first power line to which a voltage of a first driving power source is supplied and the first node, the third transistor including a gate electrode electrically connected to an emission control line. The first capacitor is connected between the first node and the third node. The second capacitor is connected between the second node and the third node. The third capacitor is connected between the third node and a second power line to which a voltage of a second driving power source is supplied. The light emitting element is connected between the second node and the second power line.

The pixel may further include a fourth transistor including a first electrode connected to the second node, a second electrode electrically connected to a third power line to which a voltage of an initialization power source is supplied, and a gate electrode electrically connected to a second scan line.

The light emitting element may be turned off when the voltage of the initialization power source is supplied to the second node.

Each of the first transistor to the fourth transistor may be a Metal-Oxide-Semiconductor Field-Effect Transistor (MOSFET) including a body electrode.

The voltage of the first driving power source may be supplied to the body electrode of each of the first transistor to the fourth transistor.

One horizontal period may include a first period, a second period, and a third period. During the first period, the second transistor, the third transistor, and the fourth transistor may be set to be in a turn-on state. During the second period, the second transistor and the fourth transistor may be set to be in the turn-on state, and the third transistor may be set to be in a turn-off state. During the third period, the third transistor and the fourth transistor may be set to be in the turn-on state, and the second transistor may be set to be in the turn-off state.

A voltage of a data signal may be supplied to the data line during the first period to the third period.

In accordance with another aspect of the present disclosure, there is provided a pixel including a first transistor, a second transistor, a third transistor, a first capacitor, a second capacitor, a third capacitor, and a light emitting element. The first transistor includes a first electrode connected to a first node, a second electrode connected to a second node, and a gate electrode connected to a third node. The second transistor is connected between a data line and the third node, the second transistor including a gate electrode electrically connected to a first scan line. The third transistor is connected between a first power line to which a voltage of a first driving power source is supplied and the first node, the third transistor including a gate electrode electrically connected to an emission control line. The first capacitor is connected between the first node and the third node. The second capacitor is connected between the second node and the third node. The third capacitor is connected between the third node and the first power line. The light emitting element is connected between the second node and a second power line to which a voltage of a second driving power source is supplied.

The third capacitor may be supplied with the voltage of the first driving power source through the first power line.

The pixel may further include a fourth transistor including a first electrode connected to the second node, a second electrode electrically connected to a third power line to which a voltage of an initialization power source is supplied, and a gate electrode electrically connected to a second scan line.

The light emitting element may be turned off when the voltage of the initialization power source is supplied to the second node.

Each of the first transistor to the fourth transistor may be a Metal-Oxide-Semiconductor Field-Effect Transistor (MOSFET) including a body electrode, and the voltage of the first driving power source may be supplied to the body electrode of each of the first transistor to the fourth transistor.

One horizontal period may include a first period, a second period, and a third period. During the first period, the second transistor, the third transistor, and the fourth transistor may be set to be in a turn-on state. During the second period, the second transistor and the fourth transistor may be set to be in the turn-on state, and the third transistor may be set to be in a turn-off state. During the third period, the third transistor and the fourth transistor may be set to be in the turn-on state, and the second transistor may be set to be in the turn-off state. A voltage of a data signal may be supplied to the data line during the first period to the third period.

In accordance with still another aspect of the present disclosure, there is provided a display device including pixels connected to write scan lines, initialization scan lines, data lines, and emission control lines. A pixel located on an ith pixel row, where i is an integer of 0 or more, and a jth pixel column, where j is an integer of 0 or more, includes a first transistor, a second transistor, a third transistor, a first capacitor, a second capacitor, a third capacitor, and a light emitting element. The first transistor includes a first electrode connected to a first nod, a second electrode connected to a second node, and a gate electrode connected to a third node. The second transistor is connected between a jth data line among the data lines and the third node, the second transistor being turned on when a first scan signal is supplied to a first scan line among the write scan lines. The third transistor is connected between a first power line to which a voltage of a first driving power source is supplied and the first node, the third transistor being turned off when an emission control signal is supplied to a kth emission control line, where k is an integer of 0 or more. The first capacitor is connected between the first node and the third node. The second capacitor is connected between the second node and the third node. The third capacitor is connected to the third node. The light emitting element is connected between the second node and a second power line to which a voltage of a second driving power source is supplied.

The third capacitor may be connected between the third node and the second power line.

The third capacitor may be connected between the third node and the first power line.

The pixel located on the ith pixel row and the jth pixel column may further include a fourth transistor including a first electrode connected to the second node and a second electrode electrically connected to a third power line to which a voltage of an initialization power source is supplied, the fourth transistor being turned on when a second scan signal is supplied to a second scan line among the initialization scan lines.

Each of the first transistor to the fourth transistor may be a Metal-Oxide-Semiconductor Field-Effect Transistor (MOSFET) including a body electrode, and the voltage of the first driving power source may be supplied to the body electrode of each of the first transistor to the fourth transistor.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
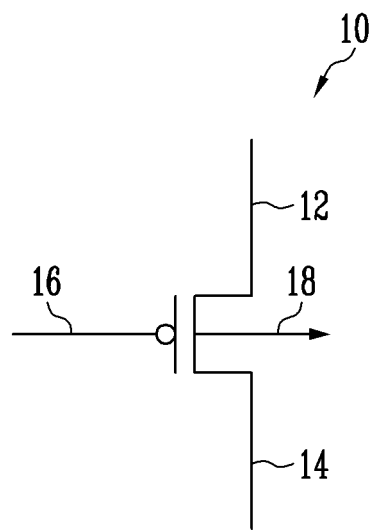
FIG. 1 is a diagram illustrating a transistor in accordance with an embodiment of the present disclosure.

Hereinafter, embodiments of the present disclosure will be described in more detail with reference to the accompanying drawings. In the description below, only a necessary part to understand an operation according to the present disclosure is described and the descriptions of other parts are omitted in order not to unnecessarily obscure subject matters of the present disclosure. In addition, the present disclosure is not limited to exemplary embodiments described herein, but may be embodied in various different forms. Rather, exemplary embodiments described herein are provided to thoroughly and completely describe the disclosed contents and to sufficiently transfer the ideas of the disclosure to a person of ordinary skill in the art.

In the entire specification, when an element is referred to as being "connected" or "coupled" to another element, it can be directly connected or coupled to the another element or be indirectly connected or coupled to the another element with one or more intervening elements interposed therebetween. The technical terms used herein are used only for the purpose of illustrating a specific embodiment and not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z, e.g., XYZ, XYY, YZ, ZZ. Similarly, for the purposes of this disclosure, "at least one selected from the group consisting of X, Y, and Z" can be construed as X only, Y only, Z only, or any combination of two or more items X, Y, and Z, e.g., XYZ, XYY, YZ, ZZ.

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

In addition, the embodiments of the disclosure are described here with reference to schematic diagrams of ideal embodiments (and an intermediate structure) of the present disclosure, so that changes in a shape as shown due to, for example, manufacturing technology and/or a tolerance may be expected. Therefore, the embodiments of the present disclosure shall not be limited to the specific shapes of a region shown here, but include shape deviations caused by, for example, the manufacturing technology. The regions shown in the drawings are schematic in nature, and the shapes thereof do not represent the actual shapes of the regions of the device, and do not limit the scope of the disclosure.

FIG. 1 is a diagram illustrating a transistor 10 in accordance with an embodiment of the present disclosure.

Referring to FIG. 1, the transistor 10 in accordance with the embodiment of the present disclosure may include a first electrode 12, a second electrode 14, a gate electrode 16, and a body electrode 18. In an example, the transistor 10 may be a Metal-Oxide-Semiconductor Field-Effect Transistor (MOSFET). Since the transistor 10, e.g., the MOSFET, including the body electrode 18 has a small mounting area, the transistor 10 may be suitable for implementing a high-resolution pixel.

The transistor 10 may be formed on a silicon wafer. In an example, a transistor layer, a light emitting layer, a cover layer, and the like may be stacked on the silicon wafer, thereby implementing a panel. However, this is merely illustrative, and the transistor 10 may be formed on various substrates (e.g., a glass substrate) currently known in the art.

The first electrode 12 of the transistor 10 may be set as a source electrode (or drain electrode), and the second electrode 14 of the transistor 10 may be set to a drain electrode (or source electrode). When the transistor 10 includes the body electrode 18, a threshold voltage of the transistor 10 may be changed by a body effect. The body effect means that the threshold voltage of the transistor 10 is changed due to a voltage difference between the body electrode 18 and the first electrode 12 of the transistor 10.

In accordance with embodiments of the present disclosure, threshold voltage compensation may be possible while using, as a driving transistor, the transistor 10 including the body electrode 18.

Figure 2:
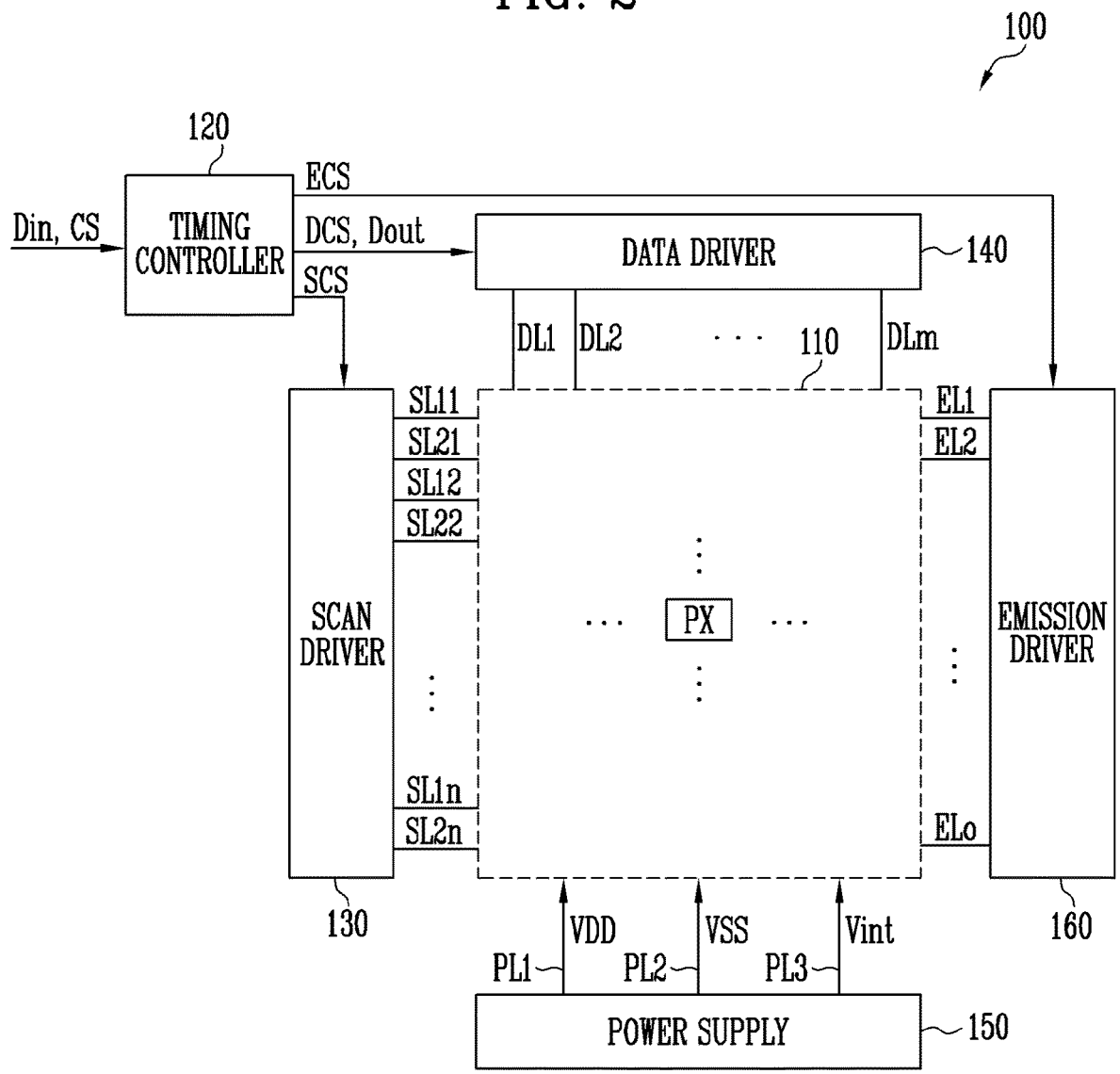
FIG. 2 is a diagram illustrating a display device in accordance with an embodiment of the present disclosure.
Figure 3:
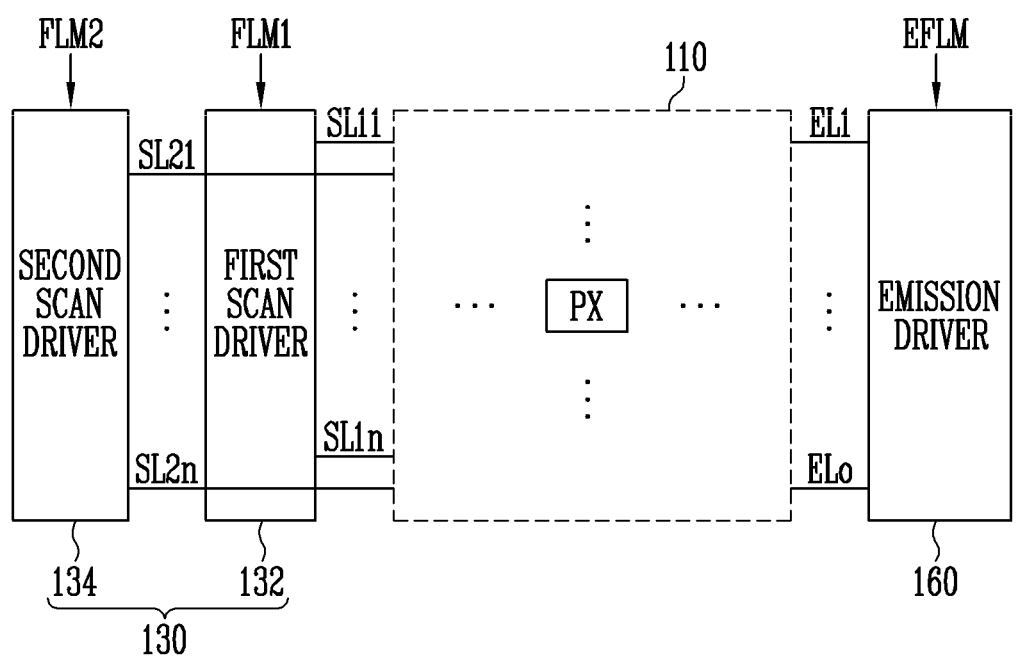
FIG. 3 is a diagram illustrating an embodiment of a scan driver, a data driver, and a power supply, which are shown in FIG. 2.

FIG. 2 is a diagram illustrating a display device 100 in accordance with an embodiment of the present disclosure. FIG. 3 is a diagram illustrating an embodiment of a pixel unit 110, a scan driver 130, and an emission driver 160, which are shown in FIG. 2.

Referring to FIG. 2, the display device 100 in accordance with the embodiment of the present disclosure may include the pixel unit 110 (or panel), a timing controller 120, the scan driver 130, a data driver 140, a power supply 150, and the emission driver 160. The above-described components may be implemented as separate integrated circuits, and at least two components among the above-described components may be integrated into on integrated circuit. In addition, the scan driver 130 and/or the emission driver 160 may be formed in the pixel unit 110.

The pixel unit 110 may include pixels PX connected to write scan lines SL11 to SL1n, initialization scan lines SL21 to SL2n, data lines DL1 to DLm, emission control lines EL1 to ELo, and power lines PL1, PL2, and PL3, where n, m, and o are integers of 0 or more.

Figure 4:
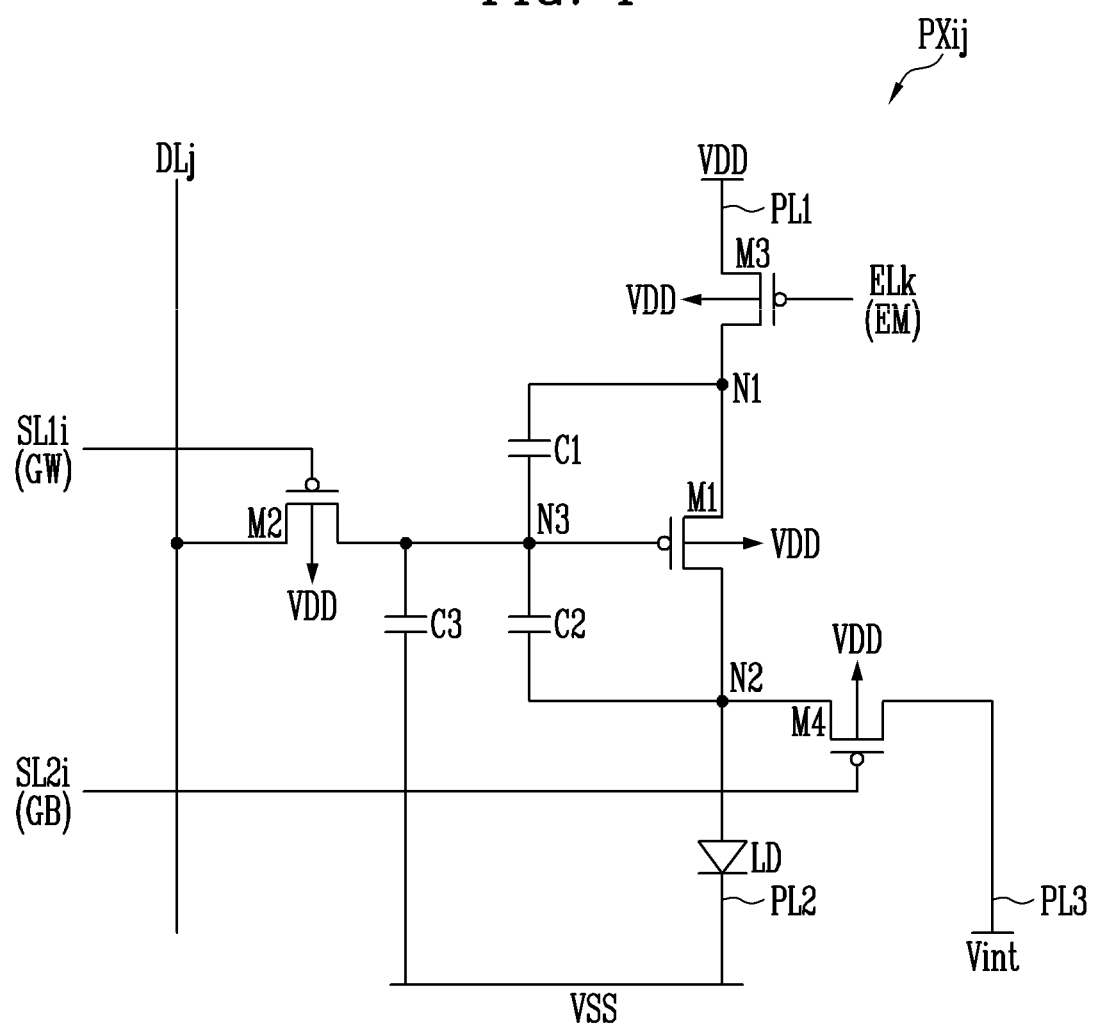
FIG. 4 is a diagram illustrating an embodiment of a pixel shown in FIG. 2.

For example, a pixel PXij, e.g., see FIG. 4, located on an ith horizontal line (or pixel row) and a jth vertical line (or pixel column) may be connected to an ith write scan line SL1i, an ith initialization scan line SL2i, a kth emission control line ELk, and a jth data line DLj, where i is an integer of n or less, j is an integer of m or less, and k is an integer of o or less. Here, k is a number which is equal to i or is smaller than i. In an example, when each of the emission control lines EL1 to ELo is connected to pixels PX located on one horizontal line, k may be a number equal to i. In an example, when each of the emission control lines EL1 to ELo is connected to pixels PX located on at least two horizontal lines, k may be a number smaller than i.

Pixels PX may be selected in units of horizontal lines, e.g., pixels PX connected to the same scan line may be sorted as one horizontal line (or pixel row), when a first scan signal is supplied to the write scan lines SL11 to SL1n. The pixels PX selected by the first scan signal may be supplied with a data signal from a data line (any one of DL1 to DLm) connected thereto. The pixels PX supplied with the data signal may generate light with a predetermined luminance, corresponding to a voltage of the data signal.

The timing controller 120 may receive input data Din and a control signal CS from a host system through an interface. In an example, the timing controller 120 may receive the input data Din and the control signal CS from at least one of a Graphics Processing Unit (GPU), a Central Processing Unit (CPU), and an Application Processor (AP), which are included in the host system. Various signals including a clock signal may be included in the control signal.

The timing controller 120 may generate a scan driving signal SCS, a data driving signal DCS, and an emission driving signal ECS, based on the control signal CS. The scan driving signal SCS, the data driving signal DCS, and the emission driving signal ECS may be respectively supplied to the scan driver 130, the data driver 140, and the emission driver 160.

The timing controller 120 may realign the input data Din to be suitable for specifications of the display device 100. Also, the timing controller 120 may generate output data Dout by correcting the input data Din, and supply the output data Dout to the data driver 140. In an embodiment, the timing controller 120 may correct the input data Din, corresponding to an optical measurement result measured in a processing process.

The scan driver 130 may receive the scan driving signal SCS from the timing controller 120. A scan start signal and clock signals, which are necessary for driving of the scan driver 130, may be included in the scan driving signal SCS. The scan driver 130 may generate the first scan signal and a second scan signal while shifting the scan start signal, corresponding to the clock signal.

To this end, the scan driver 130 may include a first scan driver 132 and a second scan driver 134 as shown in FIG. 3.

The first scan driver 132 may receive a first scan start signal FLM1, and generate the first scan signal while shifting the first scan start signal FLM1, corresponding to the clock signal. The first scan driver 132 may sequentially supply the first scan signal to the write scan lines SL11 to SL1n.

The second scan driver 134 may receive a second scan start signal FLM2, and generate the second scan signal while shifting the second scan start signal FLM2, corresponding to the clock signal. The second scan driver 134 may sequentially supply the second scan signal to the initialization scan lines SL21 to SL2n. The first scan signal and the second scan signal may be set to a gate-on voltage such that transistors included in the pixels PX can be turned on.

In an example, the first scan signal and the second scan signal, which have a low level, may be supplied to a P-type transistor, and the first scan signal and the second scan signal, which have a high level, may be supplied to an N-type transistor. The transistor supplied with the first scan signal or the second scan signal may be turned on corresponding to the first scan signal or the second scan signal. After that, that the first scan signal and the second scan signal are supplied may mean that the gate-on voltage is supplied to a write scan line SL1 and an initialization scan line SL2. Also, that the first scan signal and the second scan signal are not supplied may mean that a gate-off voltage is supplied to the write scan line SL1 and the initialization scan line SL2.

In FIG. 3, it is illustrated that the first scan driver 132 and the second scan driver 134 are respectively connected to the write scan line SL1 and the initialization scan line SL2. However, the embodiment of the present disclosure is not limited thereto. In an example, the write scan line SL1 and the initialization scan line SL2 may be driven by one scan driver.

The data driver 140 may receive the output data Dout and the data driving signal DCS from the timing controller 120. The data driving signal DCS may include a sampling signal and/or timing signals, necessary for driving of the data driver 140.

The data driver 140 may generate a data signal, based on the data driving signal DCS and the output data Dout. For example, the data driver 140 may generate an analog data signal, based on a grayscale of the output data Dout.

The data driver 140 may apply a certain voltage to the data lines DL1 to DLm, based on the generated analog data signal. For example, referring to FIG. 5, the data driver 140 may supply a voltage Vdata, e.g., see FIG. 5 of the data signal to the data lines DL1 to DLm during one horizontal period 1H, e.g., see FIG. 5.

The power supply 150 may generate various power sources necessary for driving of the display device 100. For example, the power supply 150 may generate a first driving power source VDD, a second driving power source VSS, and an initialization power source Vint.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX are set to be in an emission state.

The initialization power source Vint may be a power source which initializes a first electrode (or anode electrode) of a light emitting element LD, e.g., see FIG. 4, included in each of the pixels PX. The initialization power source Vint may have a voltage value at which the light emitting element LD is turned off when a voltage of the initialization power source Vint is supplied to the first electrode of the light emitting element LD.

The voltage of the first driving power source VDD generated in the power supply 150 may be supplied to a first power line PL1, the voltage of the second driving power source VSS generated in the power supply 150 may be supplied to a second power line PL2, and the voltage of the initialization power source Vint generated in the power supply 150 may be supplied to a third power line PL3. The first power line PL1, the second power line PL2, and the third power line PL3 may be commonly connected to the pixels PX, but the embodiment of the present disclosure is not limited thereto.

In an embodiment, the first power line PL1 may be configured with a plurality of power lines, and the plurality of power lines may be connected to different pixels PX. In an embodiment, the second power line PL2 may be configured with a plurality of power lines, and the plurality of power lines may be connected to different pixels PX. In an embodiment, the third power line PL3 may be configured with a plurality of power lines, and the plurality of power lines may be connected to different pixels PX. That is, in an embodiment of the present disclosure, the pixels PX may be connected to any one of the plurality of power lines of the first power line PL1, any one of the plurality of power lines of the second power line PL2, and any one of the plurality of power lines of the third power line PL3.

The emission driver 160 may receive the emission driving signal ECS from the timing controller 120. An emission start signal EFLM, e.g., see FIG. 3, and clock signals, which are necessary for driving the emission driver 160, may be included in the emission driving signal ECS. The emission driver 160 may generate an emission control signal while shifting the emission start signal EFLM, corresponding to the clock signal. The emission driver 160 may sequentially supply the emission control signal to the emission control lines EL1 to ELo. The emission control signal may be set to the gate-off voltage such that the transistors included in the pixels PX can be turned off.

In an example, the emission control signal having the high level may be supplied to the P-type transistor, and the emission control signal having the low level may be supplied to the N-type transistor. The transistor receiving the emission control signal may be turned off corresponding to the emission control signal. After that, that the emission control signal is supplied may mean that the gate-off voltage is supplied to an emission control line EL. Also, that the emission control signal is not supplied may mean that the gate-on voltage is supplied to the emission control line EL.

FIG. 4 is a diagram illustrating an embodiment of the pixel PX shown in FIG. 2. In FIG. 4, the pixel PXij located on an ith horizontal line and a jth vertical line will be illustrated.

Referring to FIG. 4, the pixel PXij in accordance with the embodiment of the present disclosure may be connected to corresponding signal lines SL1i, SL2i, ELk, and DLj. For example, the pixel PXij may be connected to the ith write scan line SL1i, the ith initialization scan line SL2i, the kth emission control line Elk, and the jth data line DLj. In an embodiment, the pixel PXij may be further connected to the first power line PL1, the second power line PL2, and the third power line PL3.

The pixel PXij in accordance with the embodiment of the present disclosure may include the light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a second node N2, a first transistor M1, a first node N1, and a third transistor M3, and a second electrode (or cathode electrode) of the light emitting element LD may be electrically connected to the second power line PL2. The light emitting element LD may generate light with a predetermined luminance, corresponding to an amount of current supplied to the second power line PL2 via the pixel circuit from the first power line PL1.

The light emitting element LD may be selected as an organic light emitting diode. Also, the light emitting element LD may be selected as an inorganic light emitting diode such as a micro LED (light emitting diode) or a quantum dot light emitting diode. Also, the light emitting element LD may be an element configured with a combination of an organic material and an inorganic material. In FIG. 4, it is illustrated that the pixel PXij includes a single light emitting element LD. However, in an embodiment, the pixel PXij may include a plurality of light emitting elements LD, and the plurality of light emitting elements LD may be connected in series, parallel or series/parallel to each other.

The pixel circuit may include the first transistor M1, a second transistor M2, the third transistor M3, a fourth transistor M4, a first capacitor C1, a second capacitor C2, and a third capacitor C3.

The first transistor M1 to the fourth transistor M4 may be transistors each including a body electrode. For example, each of the first transistor M1 to fourth transistor M4 may be a metal oxide semiconductor field effect transistor (MOSFET). The first transistor M1 to fourth transistor M4 may be mounted in a narrow area, and accordingly, the pixel PXij can be applied to a high-resolution panel. The body electrode of each of the first transistor M1 to fourth transistor M4 may be supplied with the voltage of the first driving power source VDD. In an example, the body electrode of each of the first transistor M1 to fourth transistor M4 may be electrically connected to the first power line PL1.

In an embodiment, each of the first transistor M1 to fourth transistor M4 may be formed as a P-type transistor. However, this is merely illustrative, and at least one of the first transistor M1 to fourth transistor M4 may be replaced with an N-type transistor.

A first electrode of the first transistor M1 may be connected to the first node N1, and a second electrode of the first transistor M1 may be connected to the second node N2. The term "being connected" includes a meaning of "being electrically connected." A gate electrode of the first transistor M1 may be connected to a third node N3. The first node N1 may mean a node to which a second electrode of the third transistor M3 is connected, and the second node N2 may mean a node to which the first electrode of the light emitting element LD is connected. The first transistor M1 may control an amount of current supplied to the second driving power source VSS via the light emitting element LD from the first driving power source VDD.

The second transistor M2 may be connected between the data line DLj and the third node N3. In addition, a gate electrode of the second transistor M2 may be electrically connected to the ith write scan line SL1i. The second transistor M2 may be turned on when a first scan signal GW is supplied to the ith write scan line SL1i, to electrically connect the data line DLj and the third node N3 to each other.

A first electrode of the third transistor M3 may be electrically connected to the first power line PL1, and the second electrode of the third transistor M3 may be connected to the first node N1. In addition, a gate electrode of the third transistor M3 may be electrically connected to the emission control line ELk. The third transistor M3 may be turned off when an emission control signal EM is supplied to the emission control line ELk, and be turned on when the emission control signal EM is not supplied. When the third transistor M3 is turned off, the first power line PL1 and the first node N1 may be electrically blocked from each other.

A first electrode of the fourth transistor M4 may be connected to the second node N2, and a second electrode of the fourth transistor M4 may be electrically connected to the third power line PL3. In addition, a gate electrode of the fourth transistor M4 may be electrically connected to the ith initialization scan line SL2i. The fourth transistor M4 may be turned on when a second scan signal GB is supplied to the ith initialization scan line SL2i, to electrically connect the second node N2 and the third power line PL3 to each other.

The first capacitor C1 may be connected between the first node N1 and the third node N3. The first capacitor C1 may transfer a voltage variation of the first node N1 to the third node N3 while being driven as a coupling capacitor. Also, the first capacitor C1 may store a voltage of the third node N3.

The second capacitor C2 may be connected between the second node N2 and the third node N3. The second capacitor C2 may transfer a voltage variation of the second node N2 while being driven as a coupling capacitor.

The third capacitor C3 may be connected between the third node N3 and the second power line PL2 to which the voltage of the second driving power source VSS is supplied. However, the embodiment of the present disclosure is not limited thereto. In an example, the third capacitor C3 may be connected to the first power line PL1 to which a voltage of the first driving power source VDD is supplied. In another example, the third capacitor C3 may be connected to an extra power line to which a voltage which is different from the voltage of any one of the first driving power source VDD and the second driving power source VSS is supplied. When the pixel PXij is driven, the voltage or voltage variation of the third node N3 may vary according to a ratio of the first, second, and third capacitors C1, C2, and C3. This will be described in detail later with reference to FIGS. 6 to 9.

Figure 5:
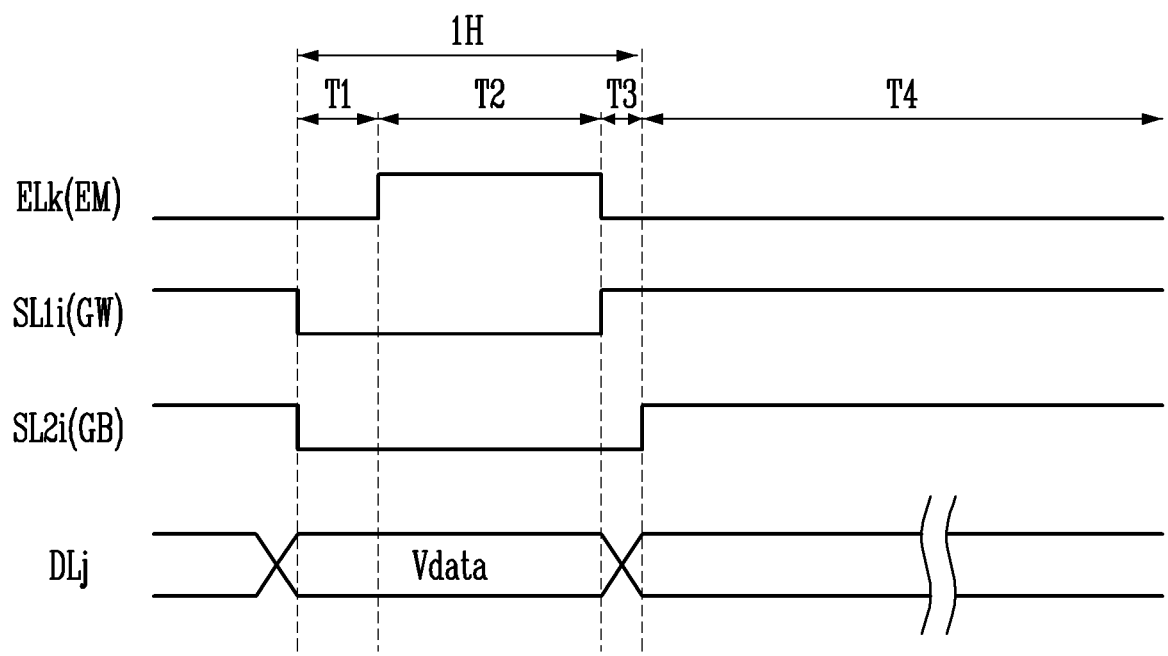
FIG. 5 is a waveform diagram illustrating an embodiment of a driving method of the pixel shown in FIG. 4.

FIG. 5 is a waveform diagram illustrating an embodiment of a driving method of the pixel PXij shown in FIG. 4.

Referring to FIGS. 2, 4, and 5, a horizontal period 1H (or specific horizontal period) in which a data signal is supplied to the pixel PXij located on the ith horizontal line and the jth vertical line may be divided into a first period T1, a second period T2, and a third period T3.

The data driver 140 may supply a voltage Vdata of the data signal to the data line DLj during the first period T1, the second period T2, and the third period T3.

The scan driver 130 (or the first scan driver 132) may supply the first scan signal GW to the ith write scan line SL1i during the first period T1 and the second period T2.

The scan driver 130 (or the second scan driver 134) may supply the second scan signal GB to the ith initialization scan line SL2i during the first period T1 to the third period T3.

The emission driver 160 may supply the emission control signal EM to the emission control line ELk during the second period T2.

The first period T1 is a period in which the voltage of the first driving power source VDD is supplied to the first node N1, the voltage of the initialization power source Vint is supplied to the second node N2, and the voltage Vdata of the data signal is supplied to the third node N3. During the first period T1, the light emitting element LD may be initialized. During the first period T1, the first capacitor C1, the second capacitor C2, and the third capacitor C3 may store the voltage Vdata of the data signal, which is supplied to the third node N3, while being initialized. The first period T1 may be referred to as an initialization period and a data signal writing period.

The second period T2 is a period in which the voltage of the initialization power source Vint is supplied to the second node N2 and the voltage Vdata of the data signal is supplied to the third node N3. During the second period T2, a voltage corresponding to a threshold voltage of the first transistor M1 may be stored in the first capacitor C1. The second period T2 may be referred to as a first threshold voltage compensation period.

During the third period T3, the first transistor M1 controls an amount of current supplied to the initialization power source Vint from the first driving power source VDD. An unnecessary current can be prevented from being supplied to the light emitting element LD after the second period T2. The third period T3 may be referred to as a luminance control period.

During a fourth period T4, the first transistor M1 controls an amount of current flowing from the first driving power source VDD to the second driving power source VSS via the light emitting element LD, corresponding to the voltage of the third node N3. During the fourth period T4, the light emitting element LD may emit light with a luminance corresponding to an amount of current supplied from the first transistor M1. The fourth period T4 may be referred to as an emission period and a second threshold voltage compensation period.

FIGS. 6 to 9 are diagrams illustrating an embodiment of an operation process of the pixel, which corresponds to a driving waveform shown in FIG. 5.

Figure 6:
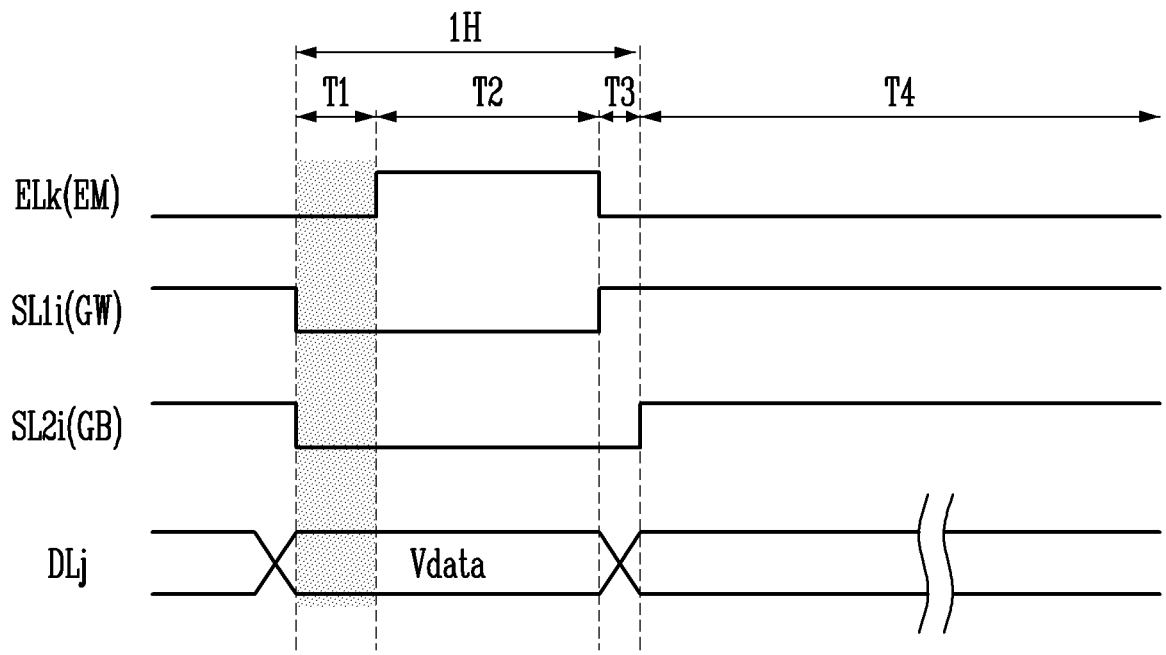
FIGS. 6, 7, 8, and 9 are diagrams illustrating an embodiment of an operation process of the pixel, which corresponds to a driving waveform shown in FIG. 5.
Figure 6:
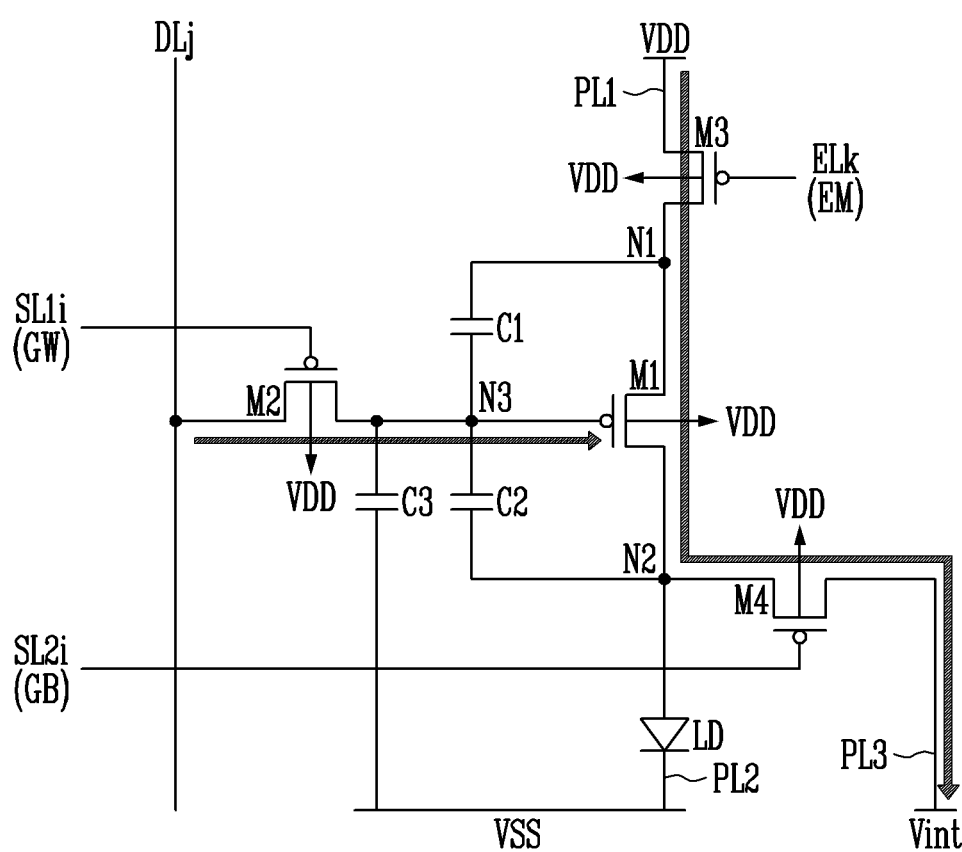

Referring to FIG. 6, during the first period T1, the first scan signal GW is supplied to the ith write scan line SL1i, and the second scan signal GB is supplied to the ith initialization scan line SL2i. Also, during the first period T1, the emission control signal EM is not supplied to the emission control line ELk, and accordingly, the third transistor M3 is set to be in a turn-on state. When the third transistor M3 is turned on, the voltage of the first driving power source VDD is supplied to the first node N1.

When the first scan signal GW is supplied to the ith write scan line SL1i, the second transistor M2 is turned on. When the second transistor M2 is turned on, the voltage Vdata of the data signal from the data line DLj is supplied to the third node N3. The first capacitor C1 may be initialized by the voltage Vdata of the data signal and the voltage of the first driving power source VDD. In an example, during the first period T1, the first capacitor C1 may charge a voltage corresponding to the voltage Vdata of the data signal and the voltage of the first driving power source VDD, regardless of a voltage charged in a previous period (or previous frame period).

When the second scan signal GB is supplied to the ith initialization scan line SL2i, the fourth transistor M4 is turned on. When the fourth transistor M4 is turned on, the voltage of the initialization power source Vint is supplied to the second node N2. When the voltage of the initialization power source Vint is supplied to the second node N2, the light emitting element LD may be initialized. In an example, when the voltage of the initialization power source Vint is supplied, a parasitic capacitor (not shown) of the light emitting element LD may be discharged. The voltage of the initialization power source Vint may be set to a voltage at which the light emitting element LD is turned off (or emits no light), and accordingly, the light emitting element LD may be set to be in a non-emission state.

The second capacitor C2 may be initialized by the voltage Vdata of the data signal, which is supplied to the third node N3, and the voltage of the initialization power source Vint, which is supplied to the second node N2. In an example, during the first period T1, the second capacitor C2 may charge a voltage corresponding to the voltage Vdata of the data signal and the voltage of the initialization power source Vint, regardless of a voltage charged in a previous period (or previous frame period).

The third capacitor C3 may be initialized by the voltage Vdata of the data signal supplied through the data line DLj. For example, the third capacitor C3 may charge a voltage corresponding to the voltage Vdata of the data signal and the voltage of the second driving power source VSS, regardless of a voltage charged in a previous period (or previous frame period).

During the first period T1, the current supplied from the first transistor M1, corresponding to the voltage of the third node N3, may be supplied to the initialization power source Vint via the fourth transistor M4. Therefore, during the first period T1, the light emitting element LD may maintain the non-emission state.

Figure 7:
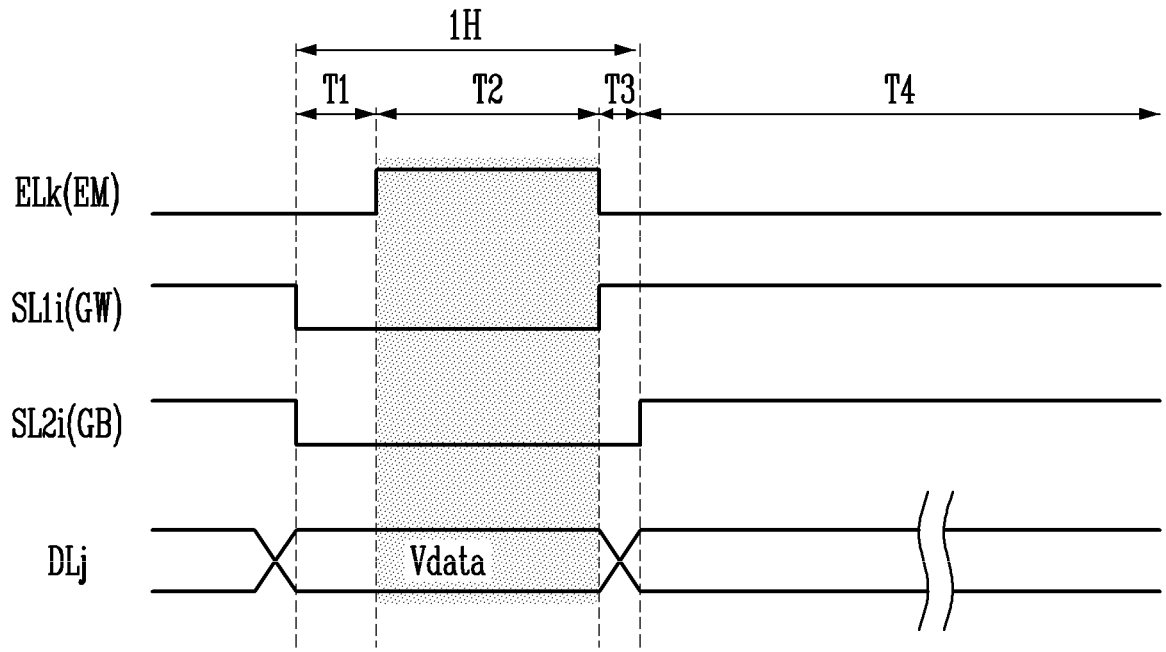
Figure 7:
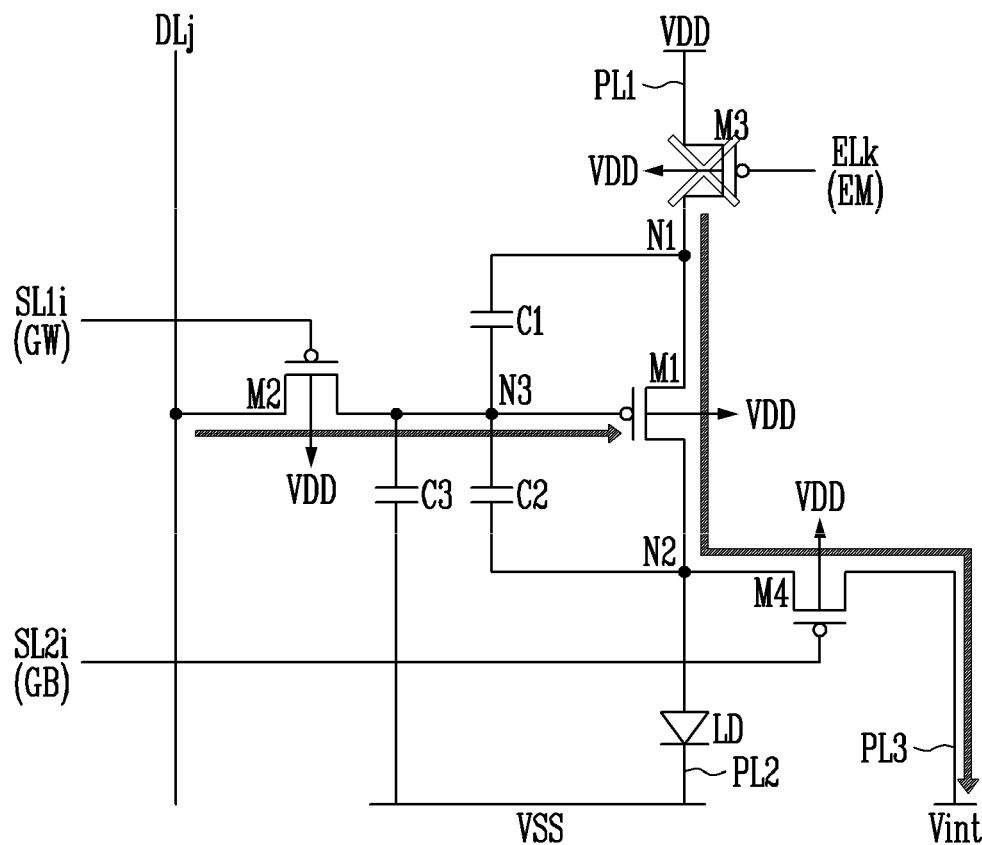

Referring to FIG. 7, during the second period T2, the turn-on state of the second transistor M2 may be maintained by the first scan signal GW supplied to the ith write scan line SL1i, and the turn-on state of the fourth transistor M4 may be maintained by the second scan signal GB supplied to the ith initialization scan line SL2i.

Also, during the second period T2, the third transistor M3 may be turned off by the emission control signal EM supplied to the emission control line ELk. When the third transistor M3 is turned off, electrical connection between the first power line PL1 and the first node N1 is blocked.

Since the second transistor M2 is set to be in the turn-on state during the second period T2, the voltage Vdata of the data signal from the data line DLj is supplied to the third node N3. A voltage of the first node N1 may be decreased from the voltage of the first driving power source VDD to a voltage (Vdata+|Vth (M1)|) obtained by adding an absolute threshold voltage of the first transistor M1 to the voltage Vdata of the data signal.

That is, during the second period T2, the third node N3 may be set to the voltage Vdata of the data signal, and the first node N1 may be set to the voltage (Vdata+|Vth (M1)|) obtained by adding the absolute threshold voltage of the first transistor M1 to the voltage Vdata of the data signal. Therefore, during the second period T2, the threshold voltage of the first transistor M1 may be stored in the first capacitor C1.

Since the fourth transistor M4 is set to be in the turn-on state during the second period T2, a current from the first node N1 to the second node N2 via the first transistor M1 may be supplied to the initialization power source Vint via the fourth transistor M4. Therefore, during the second period T2, the light emitting element LD may maintain the non-emission state.

Figure 8:
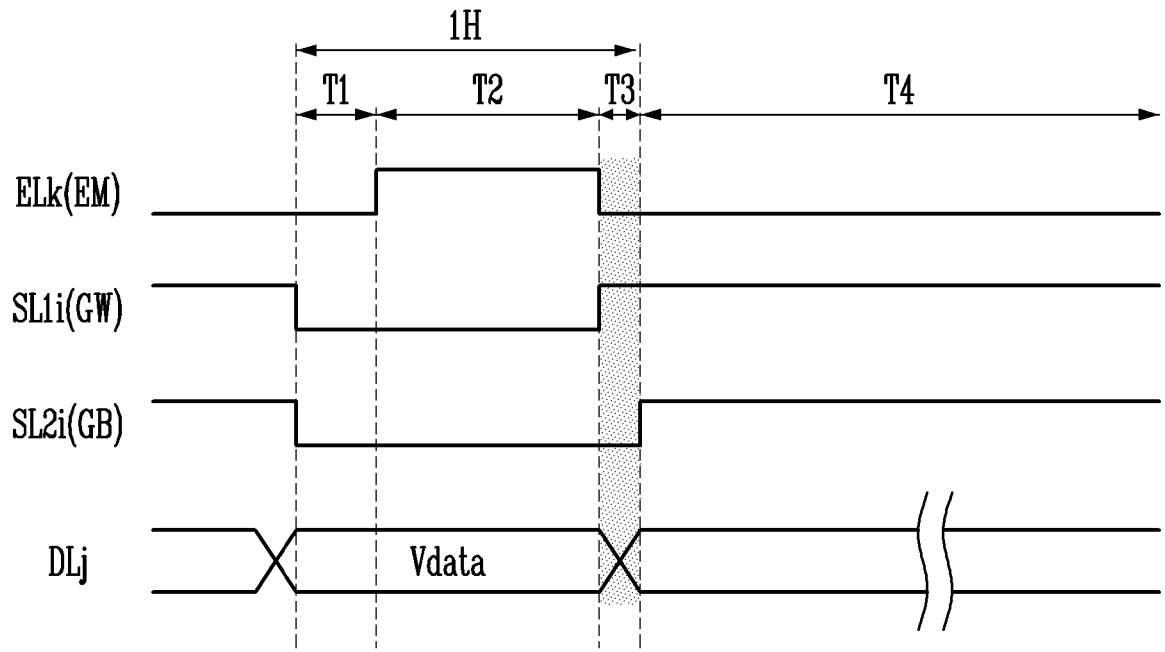
Figure 8:
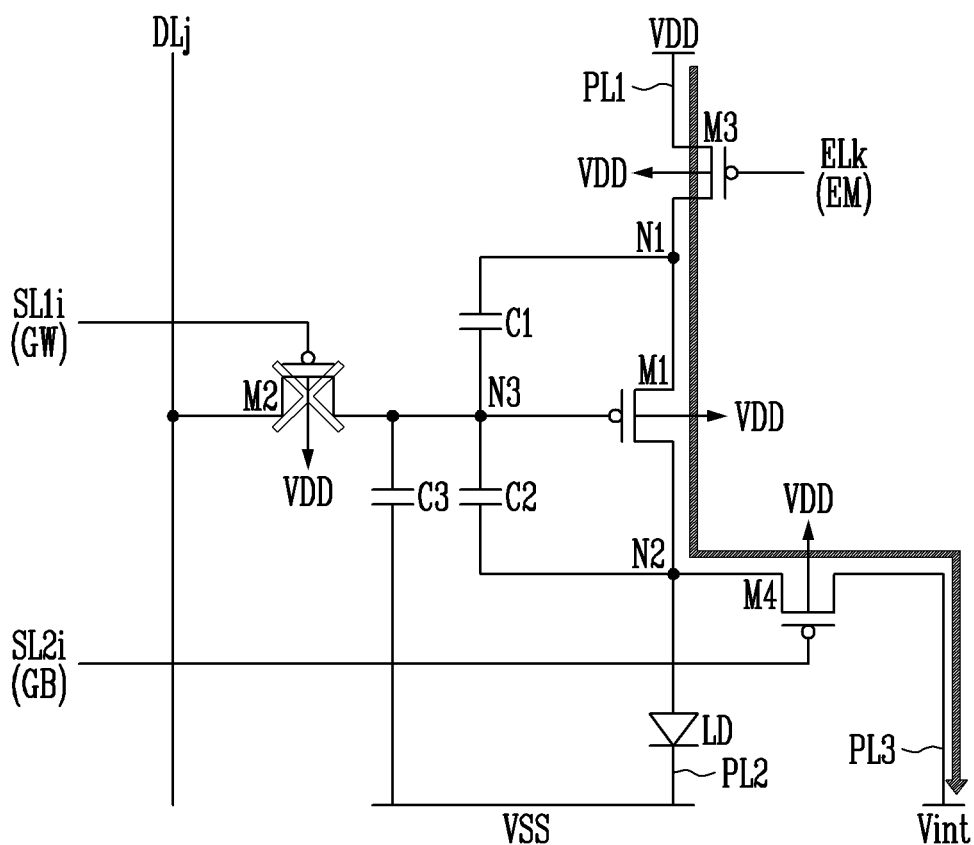

Referring to FIG. 8, during the third period T3, the supply of the emission control signal EM to the emission control line ELk is suspended, and accordingly, the third transistor M3 may be set to be in the turn-on state. Also, during the third period T3, the supply of the first scan signal GW to the ith write scan line SL1i is suspended, and accordingly, the second transistor M2 may be set to be in a turn-off state. During the third period T3, the supply of the second scan signal GB to the ith initialization scan line SL2i is maintained, and accordingly, the turn-on state of the fourth transistor M4 is maintained.

Since the third transistor M3 is set to be in the turn-on state during the third period T3, the first transistor M1 controls an amount of current supplied to the second node N2 from the first driving power source VDD, corresponding to the voltage applied to the third node N3. Since the fourth transistor M4 is set to be in the turn-on state, the current supplied to the second node N2 may be supplied to the initialization power source Vint. Accordingly, during the third period T3, the light emitting element LD is set to be in the non-emission state, and thus an accurate grayscale expression of the display device 100 can be enabled. For example, a voltage of the second node N2 may be increased to a voltage higher than a desired voltage through the second period T2. Accordingly, an unintended current may be supplied to the light emitting element LD. For example, the light emitting element LD may temporarily emit light even when a black grayscale is implemented in the pixel PXij. In the embodiment of the present disclosure, the current supplied from the first transistor M1 is supplied to the initialization power source Vint during the third period T3, and accordingly, unintended emission of the light emitting element LD can be prevented. However, when grayscales can be stably implemented in the display device 100, the third period T3 may be omitted.

Figure 9:
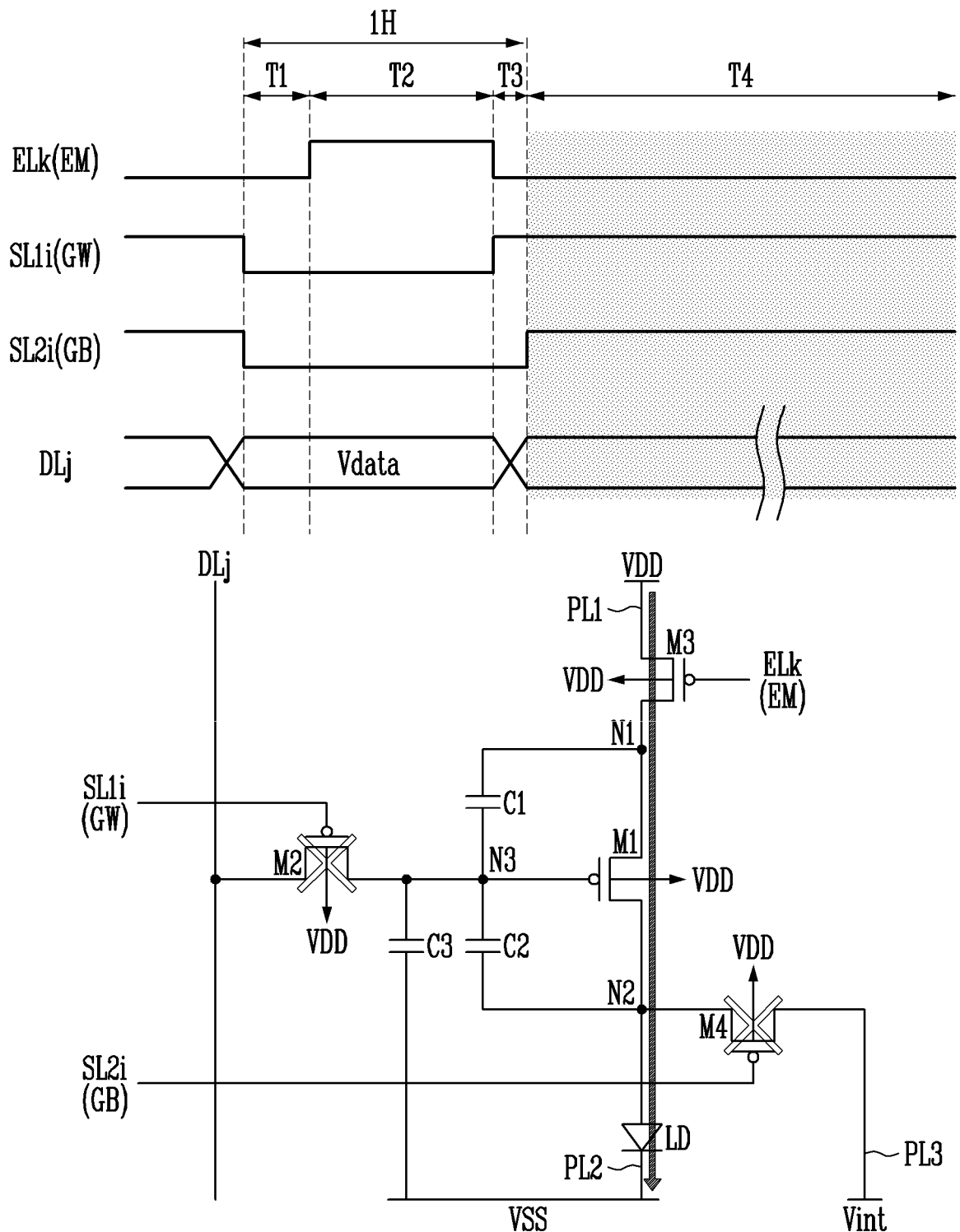

Referring to FIG. 9, the supply of the second scan signal GB to the ith initialization scan line SL2i is suspended during the fourth period T4, and accordingly, the fourth transistor M4 may be turned off. The first scan signal GW is not supplied to the ith write scan line SL1i during the fourth period T4, and accordingly, the second transistor M2 maintains the turn-off state. The emission control signal EM is not supplied to the emission control line ELk during the fourth period T4, and accordingly, the third transistor M3 maintains the turn-on state.

The first transistor M1 may control the amount of current supplied from the first driving power source VDD to the second driving power source VSS via the light emitting element LD. During the fourth period T4, the light emitting element LD may generate light with a luminance corresponding to an amount of driving current supplied from the first transistor M1.

A threshold voltage compensation process in accordance with embodiments of the present disclosure will be described in detail with reference to FIGS. 6 to 9.

First, referring to FIG. 7, the threshold voltage of the first transistor M1 may be determined by a voltage difference between a body electrode and a source electrode, e.g., the first node N1. For example, when assuming that the voltage of the driving power source VDD is set to 8V, during the second period T2, the body electrode of the first transistor M1 may be set to 8V, and the source electrode of the first transistor M1 may be set to a voltage lower than the voltage of the body electrode. In an example, when assuming that the first node N1 is set to 4V, the voltage difference between the body electrode and the source electrode of the first transistor M1 may be set to 4V, e.g., VBS=4V. The first transistor M1 may have a first threshold voltage corresponding to 4V as the voltage difference between the body electrode and the source electrode.

In the second period T2, the first threshold voltage may be compensated. For example, during the second period T2, the third node N3 is set to the voltage Vdata of the data signal, and the first node N1 is set to the voltage (Vdata+|Vth (M1)|) obtained by adding the absolute threshold voltage of the first transistor M1 to the voltage Vdata of the data signal. The threshold voltage of the first transistor M1 may be stored in the first capacitor C1. As such, in accordance with an embodiment of the present disclosure, the threshold voltage of the first transistor M1 may be primarily compensated during the second period T2. For example, after the second period T2, as the third transistor M3 is turned on, the threshold voltage reflected on the first node N1 may be reflected on the voltage of the third node N3, and turn-on and/or turn-off of the first transistor M1 may be controlled according to the reflected voltage of the third node N3. Accordingly, the first threshold voltage of the first transistor M1 can be compensated.

Meanwhile, referring to FIG. 9, the threshold voltage of the first transistor M1 may be changed in the fourth period T4. For example, during the fourth period T4, the first node N1 may be set to the voltage of the first driving power source VDD. Accordingly, the source electrode of the first transistor M1 may have the same voltage as the body electrode of the first transistor M1. For example, the voltage difference between the source electrode and the body electrode of the first transistor M1 may be about 0V. The first transistor M1 may have a second threshold voltage different from the first threshold voltage according to the changed voltage difference between the body electrode and the source electrode of the first transistor M1.

During the fourth period T4, when the voltage of the first driving voltage VDD is supplied to the first node N1, the voltage of the third node N3 may be changed according to a voltage change of the first node N1. The third period T3 may be provided as described above, and the emission control signal EM may be enabled to the low level in the third period T3 prior to the fourth period T4. In the third period T3, the voltage of the third node N3 may be changed according to the voltage change of the first node N1. In embodiments, the voltage of the third node N3 may be set as shown in Expression 1.

$$VN3a \propto Vdata + (VDD - (Vdata + |Vth(M1)|)) \times C1/(C1 + C2 + C3)$$

Expression 1

Referring to Expression 1, VN3a may denote a voltage of the third node N3. During the fourth period T4, the voltage of the first node N1 may be changed from the voltage (Vdata+|Vth (M1)|) obtained by adding the absolute threshold voltage of the first transistor M1 to the voltage Vdata of the data signal to the voltage of the first driving power source VDD. Therefore, VDD−(Vdata+|Vth (M1)|) may denote a voltage variation of the first node N1.

According to the voltage change of the first node N1, the voltage of the third node N3 may also be changed by coupling of the first capacitor C1. The changed voltage of the third node N3 may be defined as a sum of the voltage Vdata of the data signal and the voltage variation of the third node N3.

The voltage variation of the third node N3 may be determined by a ratio of the first, second, and third capacitors C1, C2, and C3. For example, as shown in Expression 1, the voltage variation of the third node N3, which is caused by the voltage variation of the first node N1, may be a value obtained by multiplying the voltage variation of the first node N1 by C1/(C1+C2+C3). As such, when the voltage variation of the third node N3 is controlled by the ratio of the first, second, and third capacitors C1, C2, and C3, a voltage range of the data signal may be set sufficiently wide. For example, the voltage range of the data signal may be determined according to components included in the pixel PXij. In an embodiment of the present disclosure, as the voltage of the third node N3 is changed according to the ratio of the first, second, and third capacitors C1, C2, and C3, the voltage Vdata range of the data signal may be set wide. For example, the voltage variation of the third node N3 may become relatively low according to the ratio of the first, second, and third capacitors C1, C2, and C3, and accordingly, the voltage of the third node N3 may also become relatively low. Therefore, although the voltage range of the data signal is set relatively wide, the voltage applied to the third node N3 may belong to a required voltage range. For example, the data driver 140 may implement 255 grayscales, using a relatively wide voltage range of about 3.29V. Accordingly, a fine grayscale expression of the pixel PXij in accordance with the embodiment of the present disclosure can be enabled.

The third capacitor C3 adjusts a ratio for reflecting the voltage variation of the first node N1 on the voltage variation of the third node N3. For example, as the voltage stored in the third capacitor C3 increases, the voltage variation of the third node N3 may decrease with respect to the voltage variation of the first node N1. The voltage range of the data signal may be selected to be more suitable for the display device 100.

Meanwhile, after the voltage of the third node N3 is set as shown in Expression 1, an amount of current supplied to the second node N2 through the first transistor M1, corresponding to the voltage of the third node N3, may vary. Accordingly, a voltage of a drain electrode, e.g., the second node N2, of the first transistor M1 may be changed.

The second node N2 and the third node N3 are connected to each other through the second capacitor C2. The voltage of the third node N3 may be further changed according to the voltage variation of the second node N2. For example, the voltage of the third node N3 may be changed by coupling of the second capacitor C2.

$$VN3b \propto VN3a + \Delta VN2 \times C2/(C1+C2+C3) \quad \text{Expression 2}$$

Referring to Expression 2, ΔVN2 may denote a voltage variation of the second node N2, and VN3$b$ may denote a voltage of the third node N3, which corresponds to the voltage variation (ΔVN2) of the second node N2. As shown in Expression 2, the voltage of the third node N3 may be determined by a value obtained by multiplying the voltage variation (ΔVN2) of the second node N2 by C2/(C1+C2+C3) and VN3$a$ of Expression 1.

In accordance with the embodiments of the present disclosure, the voltage variation (ΔVN2) of the second node N2 is reflected on the voltage of the third node N3 through the second capacitor C2, so that the threshold voltage of the first transistor M1 can be secondarily compensated.

The voltage variation (ΔVN2) of the second node N2 may be set corresponding to a threshold voltage change of the first transistor M1. For example, the voltage variation (ΔVN2) of the second node N2 may be differently determined corresponding to a change from the first threshold voltage of the first transistor M1 to the second threshold voltage of the first transistor M1. For example, the voltage variation (ΔVN2) of the second node N2 may reflect the second threshold voltage of the first transistor M1. As the voltage of the third node N3 is further changed according to the voltage variation (ΔVN2) of the second node N2, the first transistor M1 may be turned on and/or turned off, and accordingly, the second threshold voltage of the first transistor M1 can be compensated.

When the threshold voltage compensation of the first transistor M1 is not made, a current error rate (%) may become large. The current error rate represents a variation of driving current corresponding to the threshold voltage change of the first transistor M1, using percent (%). In accordance with an embodiment of the present disclosure, when the threshold voltage of the first transistor M1 included in the pixel PXij is changed to 20 mV, the current error rate may be set to about 3.4% or less. When the threshold voltage of the first transistor M1 is changed to −20 mV, the current error rate may be set to about-3.5% or less. For example, in this embodiment, the current error rate may be set between about 3.4% and −3.5%, corresponding to the threshold voltage change of the first transistor M1, and accordingly, it can be seen that the threshold voltage of the first transistor M1 is stably compensated.

In accordance with an embodiment of the present disclosure, the threshold voltage compensation is independently performed on each of first transistors M1 included in the pixels PX shown in FIG. 2. For example, each of the pixels PX included in the pixel unit 110 shown in FIG. 2 may include a first transistor. The first transistor of each of the pixels PX may provide different threshold voltages in a driving process of the display device 100. Voltage variations of first and second nodes N1 and N2 of the pixels PX may also be differently set corresponding to the threshold voltages of the respective first transistors. The voltage variations of the first and second nodes N1 and N2 reflects on third nodes N3 of the pixels PX, so that the threshold voltage of the first transistor included in each of the pixels PX can be compensated. Accordingly, the display device 100 can have an improved grayscale expression.

Figure 10:
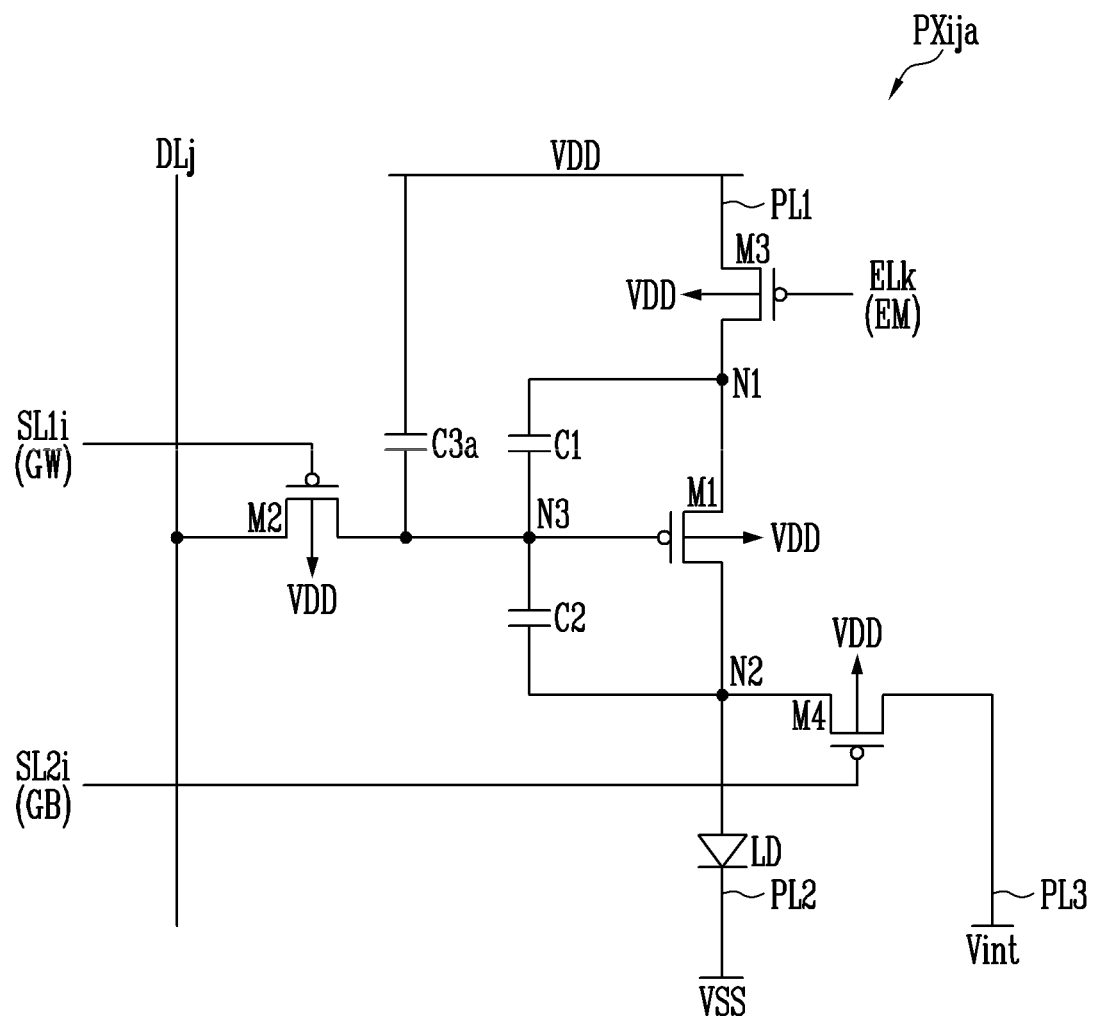
FIG. 10 is a diagram illustrating an embodiment of the pixel shown in FIG. 2.

FIG. 10 is a diagram illustrating an embodiment of the pixel PX shown in FIG. 2.

Referring to FIG. 10, a pixel PXija in accordance with an embodiment of the present disclosure may be connected corresponding signal lines SL1$i$, SL2$i$, ELk, and DLj. For example, the pixel PXija may be connected to an ith write scan line SL1$i$, an ith initialization scan line SL2$i$, a kth emission control line Elk, and a jth data line DLj. In an embodiment, the pixel PXija may be further connected to the first power line PL1, the second power line PL2, and the third power line PL3.

The pixel PXija in accordance with the embodiment of the present disclosure may include a light emitting element LD and a pixel circuit for controlling an amount of current supplied to the light emitting element LD.

In addition, the pixel circuit in accordance with the embodiment of the present disclosure may include a first transistor M1, a second transistor M2, the third transistor M3, a fourth transistor M4, a first capacitor C1, a second capacitor C2, and a third capacitor C3$a$.

Hereinafter, the pixel PXija shown in FIG. 10 may be described identically to the pixel PXij shown in FIG. 4, except the third capacitor C3$a$, and overlapping descriptions will be simplified or omitted.

Also, the pixel PXija shown in FIG. 10 may be driven identically to the operation process of the pixel PXij, which is shown in FIGS. 6 to 9, corresponding to the driving waveform of the pixel PXij shown in FIG. 5, and overlapping descriptions will be simplified or omitted.

The third capacitor C3$a$ may be connected between the third node N3 and the first power line PL1 to which the voltage of the first driving power source VDD is supplied. However, the embodiment of the present disclosure is not limited thereto. In an example, the third capacitor C3$a$ may be connected to the second power line PL2 to which a voltage of the second driving power source VSS is supplied. In another example, the third capacitor C3$a$ may be connected to an extra power line to which a voltage which is different from the voltage of any one of the first driving power source VDD and the second driving power source VSS is supplied. When the pixel PXija is driven, a voltage variation of the third node N3 may reflect the first threshold voltage and the second threshold voltage of the first transistor M1 as described with reference to FIG. 4. The voltage variation of the third node N3 may vary according to a ratio of the first, second, and third capacitors C1, C2, and C3$a$.

Referring to FIG. 6, in the first period T1, the voltage of the first driving power source VDD may be supplied to the first node N1, the voltage of the initialization power source Vint may be supplied to the second node N2, and the voltage Vdata of the data signal may be supplied to the third node N3. During the first period T1, while the first capacitor C1, the second capacitor C2, and the third capacitor C3a are initialized, the first capacitor C1, the second capacitor C2, and the third capacitor C3a may store the voltage Vdata of the data signal, which is supplied to the third node N3. For example, the third capacitor C3a may be initialized by the voltage Vdata of the data signal supplied through the data line DLj. Accordingly, during the first period T1, the third capacitor C3a may charge a voltage corresponding to the voltage Vdata of the data signal, regardless of a voltage charged in a previous period (or previous frame period).

Also, referring to FIG. 7, in the second period T2, the first threshold voltage of the first transistor M1 of the pixel PXija may be compensated. For example, during the second period T2, the third node N3 is set to the voltage Vdata of the data signal, and the first node N1 is set to the voltage (Vdata+|Vth (M1)|) obtained by adding the absolute threshold voltage of the first transistor M1 to the voltage Vdata of the data signal. The threshold voltage of the first transistor M1 may be stored in the first capacitor C1. Accordingly, a voltage between the gate electrode and the source electrode of the first transistor M1 may be equally maintained. As such, in accordance with an embodiment of the present disclosure, the threshold voltage of the first transistor M1 may be primarily compensated during the second period T2.

Referring to FIG. 9, during the fourth period T4, the voltage of the first node N1 of the pixel PXija may be changed from the voltage (Vdata+|Vth (M1)|) obtained by adding the absolute threshold voltage of the first transistor M1 to the voltage Vdata of the data signal to the voltage of the first driving power source VDD. Accordingly, the voltage of the third node N3 may also be changed by coupling of the first capacitor C1.

The voltage variation of the third node N3 of the pixel PXija may be determined corresponding to the ratio of the first, second, and third capacitors C1, C2, and C3a. For example, the voltage of the third node N3 may be changed by a value obtained by multiplying a voltage variation of the first node N1 by C1/(C1+C2+C3a) from the voltage Vdata of the data signal.

As such, when the voltage variation of the third node N3 is controlled by the ratio of the first, second, and third capacitors C1, C2, and C3a, a voltage range of the data signal may be set sufficiently wide. For example, the voltage range of the data signal may be determined according to a layout of the pixel PXija. In accordance with an embodiment of the present disclosure, as the voltage of the third node N3 is changed corresponding to the ratio of the first, second, and third capacitors C1, C2, and C3a, the voltage Vdata range of the data signal may be set wide. Also, in in accordance with an embodiment of the present disclosure, the data driver 140 shown in FIG. 2 may implement 32 to 255 grayscales, using a voltage range of about 3.5V. Accordingly, a fine grayscale expression of the pixel PXija in accordance with the embodiment of the present disclosure can be enabled.

After that, the voltage of the third node N3 may be changed according to a voltage change of the second node N2. For example, the voltage of the third node N3 may be changed by coupling of the second capacitor C2. During the fourth period T4, the voltage of the third node N3 may be changed by a value obtained by multiplying the voltage variation (ΔVN2) of the second node N2 by C2/(C1+C2+C3a).

In accordance with the embodiments of the present disclosure, the voltage variation (ΔVN2) of the second node N2 is reflected on the voltage of the third node N3, so that the threshold voltage of the first transistor M1 included in the pixel circuit of the pixel PXija can be compensated. For example, in the fourth period T4, the voltage variation (ΔVN2) of the second node N2 may be differently determined corresponding to a change from the first threshold voltage to the second threshold voltage of the first transistor M1. Accordingly, the threshold voltage of the first transistor M1 included in the pixel circuit of the pixel PXija can be stably compensated.

In the pixel and the display device including the same in accordance with the present disclosure, the pixel can be implemented using a transistor, e.g., a MOSFET, suitable for high resolution. In accordance with the present disclosure, the pixel includes a driving transistor having a body electrode, and accordingly, a threshold voltage of the driving transistor can be stably compensated. Also, in accordance with the present disclosure, the pixel can widely set a voltage range of a data signal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A pixel comprising:
    a first transistor including a first electrode connected to a first node, a second electrode connected to a second node, and a gate electrode connected to a third node;
    a second transistor connected between a data line and the third node, the second transistor including a gate electrode electrically connected to a first scan line;
    a third transistor connected between a first power line to which a voltage of a first driving power source is supplied and the first node, the third transistor including a gate electrode electrically connected to an emission control line;
    a first capacitor connected between the first node and the third node;
    a second capacitor connected between the second node and the third node;
    a third capacitor connected between the third node and a second power line to which a voltage of a second driving power source is supplied; and
    a light emitting element connected between the second node and the second power line.

2. The pixel of claim 1, further comprising a fourth transistor including a first electrode connected to the second node, a second electrode electrically connected to a third power line to which a voltage of an initialization power source is supplied, and a gate electrode electrically connected to a second scan line.

3. The pixel of claim 2, wherein the light emitting element is turned off when the voltage of the initialization power source is supplied to the second node.

4. The pixel of claim 2, wherein each of the first transistor to the fourth transistor is a Metal-Oxide-Semiconductor Field-Effect Transistor (MOSFET) including a body electrode.

5. The pixel of claim 4, wherein the voltage of the first driving power source is supplied to the body electrode of each of the first transistor to the fourth transistor.

6. The pixel of claim 2, wherein one horizontal period includes a first period, a second period, and a third period,
wherein, during the first period, the second transistor, the third transistor, and the fourth transistor are set to be in a turn-on state,
wherein, during the second period, the second transistor and the fourth transistor are set to be in the turn-on state, and the third transistor is set to be in a turn-off state, and
wherein, during the third period, the third transistor and the fourth transistor are set to be in the turn-on state, and the second transistor is set to be in the turn-off state.

7. The pixel of claim 6, wherein a voltage of a data signal is supplied to the data line during the first period to the third period.

8. A pixel comprising:
a first transistor including a first electrode connected to a first node, a second electrode connected to a second node, and a gate electrode connected to a third node;
a second transistor connected between a data line and the third node, the second transistor including a gate electrode electrically connected to a first scan line;
a third transistor connected between a first power line to which a voltage of a first driving power source is supplied and the first node, the third transistor including a gate electrode electrically connected to an emission control line;
a first capacitor connected between the first node and the third node;
a second capacitor connected between the second node and the third node;
a third capacitor connected between the third node and the first power line; and
a light emitting element connected between the second node and a second power line to which a voltage of a second driving power source is supplied.

9. The pixel of claim 8, wherein the third capacitor is supplied with the voltage of the first driving power source through the first power line.

10. The pixel of claim 8, further comprising a fourth transistor including a first electrode connected to the second node, a second electrode electrically connected to a third power line to which a voltage of an initialization power source is supplied, and a gate electrode electrically connected to a second scan line.

11. The pixel of claim 10, wherein the light emitting element is turned off when the voltage of the initialization power source is supplied to the second node.

12. The pixel of claim 10, wherein each of the first transistor to the fourth transistor is a Metal-Oxide-Semiconductor Field-Effect Transistor (MOSFET) including a body electrode, and the voltage of the first driving power source is supplied to the body electrode of each of the first transistor to the fourth transistor.

13. The pixel of claim 10, wherein one horizontal period includes a first period, a second period, and a third period,
wherein, during the first period, the second transistor, the third transistor, and the fourth transistor are set to be in a turn-on state,
wherein, during the second period, the second transistor and the fourth transistor are set to be in the turn-on state, and the third transistor is set to be in a turn-off state,
wherein, during the third period, the third transistor and the fourth transistor are set to be in the turn-on state, and the second transistor is set to be in the turn-off state, and
wherein a voltage of a data signal is supplied to the data line during the first period to the third period.

14. A display device comprising:
pixels connected to write scan lines, initialization scan lines, data lines, and emission control lines,
wherein a pixel located on an ith pixel row, where i is an integer of 0 or more, and a jth pixel column, where j is an integer of 0 or more, includes:
a first transistor including a first electrode connected to a first node, a second electrode connected to a second node, and a gate electrode connected to a third node;
a second transistor connected between a jth data line among the data lines and the third node, the second transistor being turned on when a first scan signal is supplied to a first scan line among the write scan lines;
a third transistor connected between a first power line to which a voltage of a first driving power source is supplied and the first node, the third transistor being turned off when an emission control signal is supplied to a kth emission control line, where k is an integer of 0 or more;
a first capacitor connected between the first node and the third node;
a second capacitor connected between the second node and the third node;
a third capacitor connected to the third node; and
a light emitting element connected between the second node and a second power line to which a voltage of a second driving power source is supplied.

15. The display device of claim 14, wherein the third capacitor is connected between the third node and a power line.

16. The display device of claim 15, wherein the power line is the first power line or the second power line.

17. The display device of claim 14, wherein the pixel located on the ith pixel row and the jth pixel column further includes a fourth transistor including a first electrode connected to the second node and a second electrode electrically connected to a third power line to which a voltage of an initialization power source is supplied, the fourth transistor being turned on when a second scan signal is supplied to a second scan line among the initialization scan lines.

18. The display device of claim 17, wherein each of the first transistor to the fourth transistor is a Metal-Oxide-Semiconductor Field-Effect Transistor (MOSFET) including a body electrode, and the voltage of the first driving power source is supplied to the body electrode of each of the first transistor to the fourth transistor.

* * * * *